United States Patent
Bhoi et al.

(10) Patent No.: US 7,117,263 B1
(45) Date of Patent: Oct. 3, 2006

(54) APPARATUS AND METHOD FOR PROCESSING REQUESTS FROM AN EXTERNAL QUEUE IN A TCP/IP-BASED APPLICATION SYSTEM

(75) Inventors: Preeti N. Bhoi, Cupertino, CA (US); Srinivas Ramanathan, Chennai (IN); Sharad Singhal, Belmont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 703 days.

(21) Appl. No.: 09/495,818

(22) Filed: Feb. 1, 2000

(51) Int. Cl.
*G06F 15/16* (2006.01)

(52) U.S. Cl. ...................... 709/226; 709/232

(58) Field of Classification Search ................ 709/103, 709/104, 225, 227, 229, 235; 209/226, 232
See application file for complete search history.

(56) References Cited

U.S. PATENT DOCUMENTS

| | | | |
|---|---|---|---|
| 3,623,006 A | 11/1971 | Balakian et al. | |
| 5,265,252 A | 11/1993 | Rawson et al. | |
| 5,623,603 A | 4/1997 | Jiang et al. | |
| 5,699,521 A | 12/1997 | Iizuka et al. | |
| 5,799,002 A | 8/1998 | Krishnan | |
| 5,805,577 A | 9/1998 | Jain et al. | |
| 5,878,224 A | 3/1999 | Smith | |
| 5,936,940 A | 8/1999 | Marin et al. | |
| 5,938,733 A * | 8/1999 | Heimsoth et al. | |
| 5,938,749 A | 8/1999 | Rusu et al. | |
| 6,006,269 A | 12/1999 | Phaal | |
| 6,055,564 A | 4/2000 | Phaal | |
| 6,119,143 A * | 9/2000 | Dias et al. ................ | 709/225 |
| 6,125,397 A | 9/2000 | Yoshimura et al. | |
| 6,154,769 A | 11/2000 | Cherkasova et al. | |
| 6,173,322 B1 * | 1/2001 | Hu ............................ | 709/225 |
| 6,182,109 B1 * | 1/2001 | Sharma et al. | |
| 6,185,598 B1 * | 2/2001 | Farber et al. ............... | 709/235 |
| 6,215,791 B1 | 4/2001 | Kim | |
| 6,226,377 B1 | 5/2001 | Donaghue, Jr. | |
| 6,243,580 B1 * | 6/2001 | Garner | |
| 6,314,463 B1 | 11/2001 | Abbott et al. | |
| 6,321,272 B1 * | 11/2001 | Swales | |
| 6,323,881 B1 | 11/2001 | Broulik et al. | |
| 6,330,719 B1 | 12/2001 | Zigmond et al. | |
| 6,351,775 B1 * | 2/2002 | Yu | |
| 6,360,270 B1 | 3/2002 | Cherkasova et al. | |
| 6,363,421 B1 * | 3/2002 | Barker et al. .............. | 709/235 |
| 6,374,297 B1 * | 4/2002 | Wolf et al. ................. | 709/235 |
| 6,389,448 B1 * | 5/2002 | Primak et al. ............. | 709/225 |
| 6,393,477 B1 * | 5/2002 | Paxhia et al. | |
| 6,411,986 B1 * | 6/2002 | Susai et al. | |

(Continued)

*Primary Examiner*—Andrew Caldwell
*Assistant Examiner*—Stephan Willett
(74) *Attorney, Agent, or Firm*—Richard P. Lange

(57) ABSTRACT

A TCP/IP-based application system includes an application module that performs predetermined functions based on external requests received from an external queue. The external queue is external to the application system and stores the external requests before the requests are fetched into the application system. A network interaction module is coupled to the application module and the external queue (1) to fetch the external requests from the external queue into the application system and (2) to determine which, if any, of the fetched requests will not be processed by the application module based on the processing capacity of the application module and the rate of the external requests arriving at the external queue such that when the application module is overloaded, TCP timeouts for requests stored in the external queue are minimized and the chance of those requests stored in the external queue from being dropped is also minimized.

20 Claims, 8 Drawing Sheets

U.S. PATENT DOCUMENTS

| | | |
|---|---|---|
| 6,434,559 B1 | 8/2002 | Lundberg et al. |
| 6,434,631 B1 | 8/2002 | Bruno et al. |
| 6,487,212 B1 | 11/2002 | Frimli et al. |
| 6,516,350 B1 * | 2/2003 | Lumelsky et al. .......... 709/225 |
| 6,542,950 B1 | 4/2003 | Bodnar |

* cited by examiner

APPARATUS AND METHOD FOR PROCESSING REQUESTS FROM AN EXTERNAL QUEUE IN A TCP/IP-BASED APPLICATION SYSTEM

BACKGROUND OF THE INVENTION

1. Field of the Invention

The present invention pertains to the Internet. More particularly, this invention relates to a traffic-aware request processing scheme for TCP/IP-based network applications.

2. Description of the Related Art

With the rapid growth of the Internet, more and more business and residential users are beginning to rely on the Internet for their mainstream and mission-critical activities. As is known, the Internet typically refers to a number of data service systems connected together via a high speed interconnect network (see FIG. 1). Each data service system typically includes Internet server applications that host contents for various customers. The Internet server applications can also host applications. Remote user terminals (e.g., terminals 11a–11n in FIG. 1) may be connected to a data service system (e.g., the data service system 20 in FIG. 1) via an interconnect network. Each user terminal is equipped with a web browser (or other software such as an e-mail software) that allows the user terminal to access the contents and/or applications hosted in various data service systems.

Popular Internet applications include World Wide Web (WWW), E-mail, news, and FTP applications. Other emerging applications such as E-commerce payment processing, content distribution allow various data service systems (e.g., data service systems 20 and 13 in FIG. 1) to interact with one another. All of these applications follow the client-server model and rely on the Transmission Control Protocol (TCP) for reliable delivery of information/applications between severs and clients. New connection requests received by a data service system (e.g., the system 20 in FIG. 2) are first processed by a TCP/IP stack which is part of the data service system's kernel (i.e., operating system). FIG. 2 shows that the kernel 21 is external to the server application 25 that processes the new connection requests received. The TCP/IP stack in the kernel 21 holds the new connection requests in TCP listen queues, one queue per port. The maximum number of requests that can be held in a listen queue is a configurable parameter. When a server application is ready to process a new request, the server application accepts a new request from its associated listen queue. At this time, the new request is removed from the listen queue.

Such a prior art scheme, however, bears a number of disadvantages. One disadvantage is that the scheme only processes the queued requests sequentially. This means that the server application first accepts a connection request from the external listen queue, processes the accepted connection request, and then proceeds to pick up the next connection request. Even when the server application has multiple processing threads, each thread accepts and processes connection requests from the listen queue sequentially. This sequential feature, although simple to implement, has two key drawbacks. The first one is the long response time of the server application to the connection requests when the server application is overloaded. Since a server application processes incoming requests in sequence, it is typically unaware of the number of requests that are awaiting processing in the listen queue at any given time. When the server application is overloaded (i.e., the rate of incoming requests exceeds the processing rate of the application server), more and more requests accumulate in the listen queue. When the listen queue is full, new requests are dropped from listen queue while the server application is totally unaware of such drops. Dropped connection requests typically cause timeouts at the TCP layer of the client. Since a TCP timeout typically lasts for several seconds, dropped connection requests result in very poor response time for the user/client applications accessing the server.

The second drawback is that a request may be dropped without being first considered by the server application to determine whether the request should be serviced or not. This drawback is particularly evident when the server application is capable of classifying the incoming connection requests into basic and premium classes and offering different treatment to requests in each class. For example, requests of the premium class could be handled at higher priority. The classification, however, is typically done in the server application and TCP/IP stack is not aware of the classification. When overflows happens in the listen queue, both basic and premium requests are dropped out of the listen queue. In this case, premium users do not receive the expected level of performance.

SUMMARY OF THE INVENTION

One feature of the present invention is to minimize response time of a TCP-based application server with respect to external requests.

Another feature of the present invention is to provide a traffic-aware request processing mechanism that minimizes (1) the possibility of TCP timeouts and (2) the possibility of requests from being dropped out of a TCP listen queue.

A further feature of the present invention is to allow a TCP/IP-based application server, rather than the server's TCP/IP stack, to decide which of the external requests need to be denied service under overload conditions.

A TCP/IP-based application system includes an application module that performs predetermined functions based on external requests received from an external queue. The external queue is external to the TCP/IP-based application system and stores the external requests before the requests are fetched into the TCP/IP-based application system for processing. A network interaction module is coupled to the application module and the external queue to fetch the external requests from the external queue into the TCP/IP-based application system, and to determine which, if any, of the fetched requests will not be processed by the application module based on the processing capacity of the application module and the rate of the external requests arriving at the external queue such that (1) the response time of the TCP-based application system to the external requests is minimized and (2) the number of requests dropped out of the external queue is minimized.

When the network interaction module receives a batch of requests from the external queue, it decides how many of the fetched requests can be serviced by the application module, based on estimates of the incoming load and the processing load of the application module. The network interaction module rejects those requests that are determined not to be serviced by either closing their TCP connections or sending back a rejection response to their requesters. This minimizes (1) the response time of the TCP-based application system to the external requests and (2) the number of requests dropped out of the external queue. Although the present invention is described in the context of TCP applications, the traffic-aware request processing mechanism is applicable in any context in which connection-oriented communication is used for data exchange.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
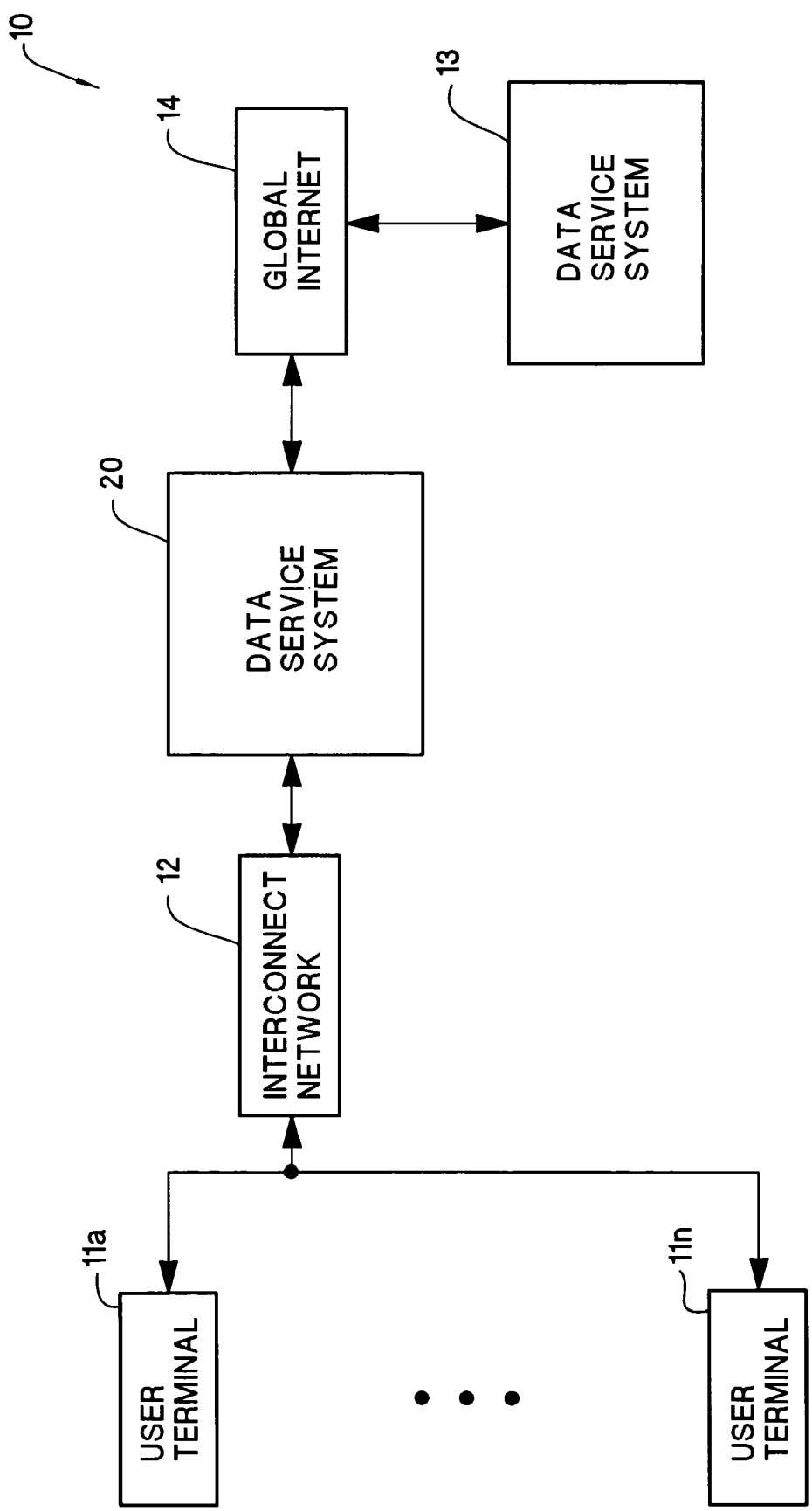
FIG. 1 schematically shows the structure of the Internet.
Figure 2:
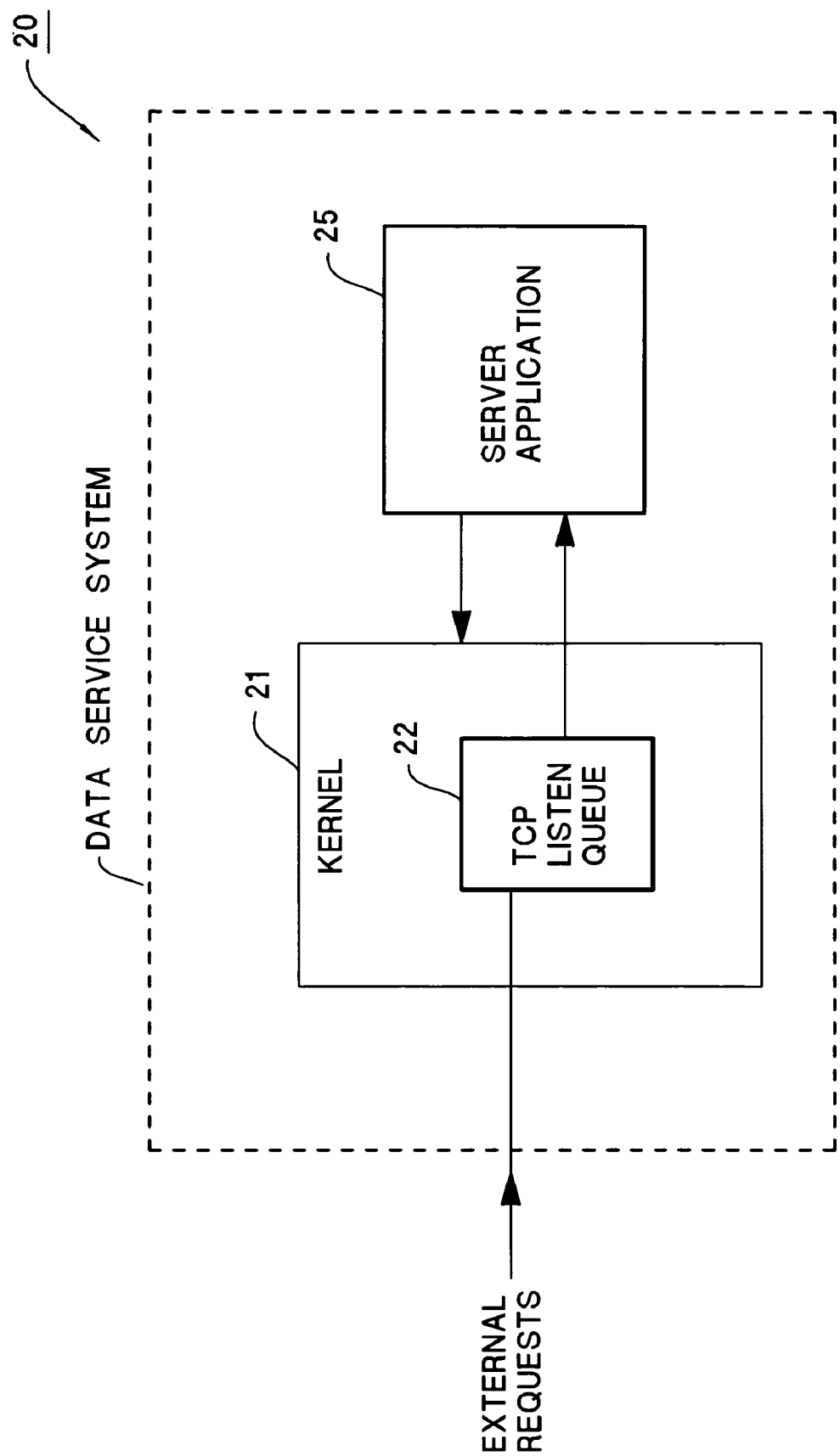
FIG. 2 shows a prior art arrangement of the data service system employed in the Internet of FIG. 1.
Figure 3:
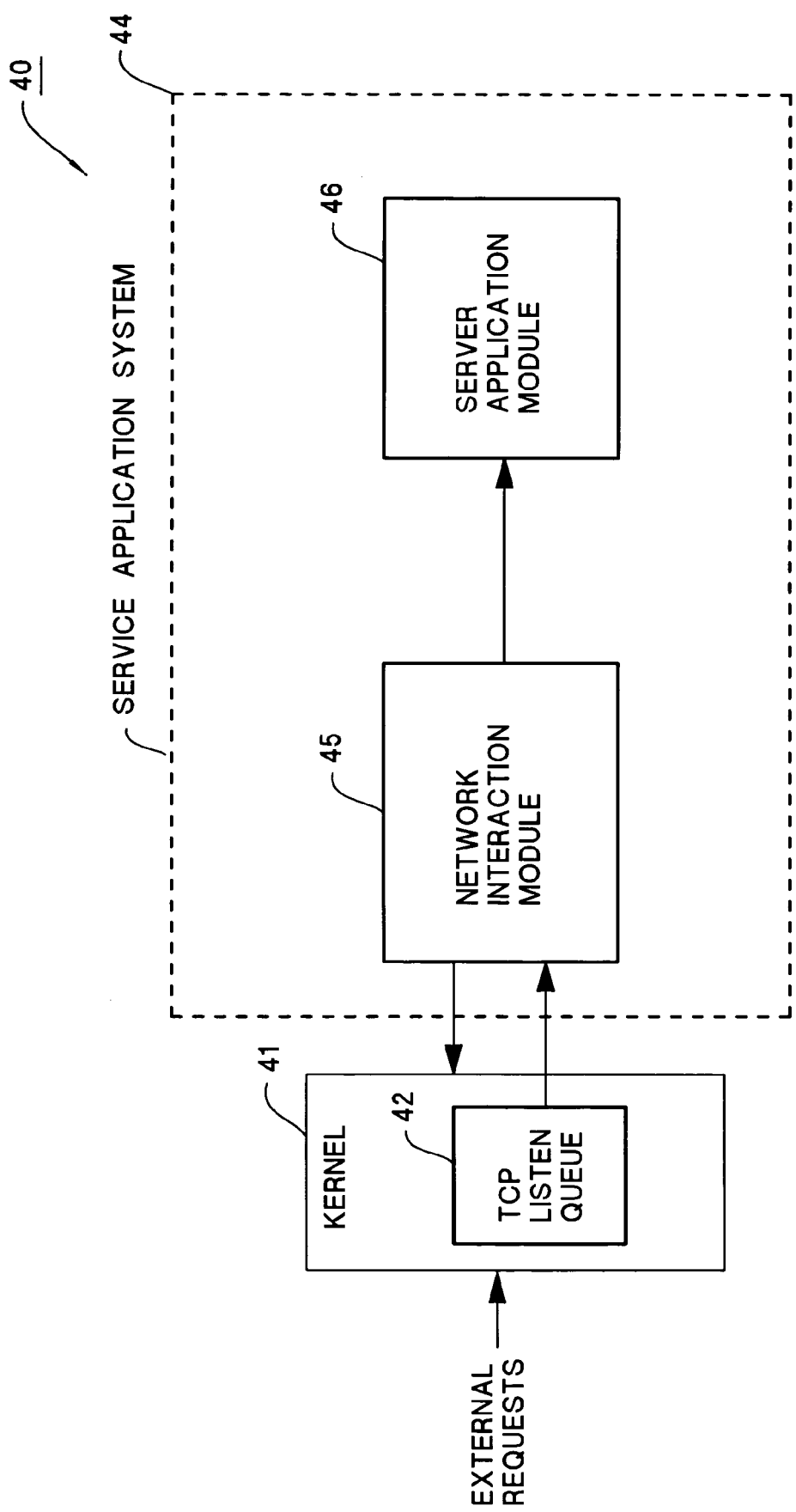
FIG. 3 shows the structure of a data service system having a server application system in accordance with one embodiment of the present invention and a kernel external to the server application system.

FIG. 3 shows a data service system 40 that includes a server application system 44. The server application system 44 is connected to a kernel 41 external to the server application system 44. The kernel 41 is basically the operating system of the data service system 40. Examples are the operating system kernel for operating systems such as HP/Unix for Hewlett-Packard Company, Windows NT from Microsoft Corporation, Linux, and Solaris from Sun Microsystems Company. The kernel 41 includes a TCP listen queue 42 that receives and stores external TCP connection requests for the data service system 40 before the requests are fetched into the server application system 44 for processing. The listen queue 42 is external to the server application system 44 and in part of the kernel 41.

As can be seen from FIG. 3, the server application system 44 includes a network interaction module 45 that implements one embodiment of the present invention. The server application system 44 also includes a server application module 46.

As will be described in more detail below, the network interaction module 45 is connected to the server application module 46 and to the external listen queue 42. The network interaction module 45 periodically fetches the external connection requests stored in the TCP listen queue 42 into the network interaction module 45. This means that the network interaction module 45 causes the external requests to be fetched into the server application system 44, thus allowing the fetched requests to be screened by the server application system 44 before they are serviced.

The fetched external requests by the network interaction module 45 are stored in an internal queue (i.e., the internal queue 62 in FIG. 4) of the network interaction module 45. The network interaction module 45 then determines which of the fetched requests, if any, will not be processed by the application module 46 based on the processing capacity of the application module 46 and the rate of the external requests arriving at the listen queue 42. Then the network interaction module 45 rejects those external requests that it determines can not be processed. This causes (1) the response time of the server application system 44 to the external requests to be minimized and (2) the number of requests dropped out of the external listen queue 42 to be minimized.

The process that the network interaction module 45 determines which of the fetched requests from the internal queue 62 will not be processed by the application module 46 includes a number of steps. First, if the network interaction module 45 determines that new requests are received in the listen queue 42, then the network interaction module 45 reduces (e.g., by half) the number of fetched requests to be processed by the application module 46. If, however, the network interaction module 45 determines that no new requests are received in the external listen queue 62, then the network interaction module 45 increases (e.g., doubles) the number of fetched requests to be processed by the application module 46. The unprocessed requests remain in the internal queue 62. In one embodiment, the reduction or increase of the number of the requests to be processed is done by a factor of two.

Next, the network interaction module 45 accesses the external listen queue 42 to fetch all the new requests from the listen queue 42 into the internal queue 62. If some or all of the newly fetched requests cannot be stored in the internal queue 62 because the queue is full, then these requests are regarded as the not-to-be-processed requests and will be rejected by the network interaction module 45.

One advantage of the present invention is that it minimizes the response time of the server application system 44 to external requests. This is due to the fact that the network interaction module 45 determines which of the fetched requests are not to be processed before the requests are processed by the application module 46. If a requested is determined not to be processed, the network interaction module 46 either closes its TCP connection, or sends a rejection response with the status information, thus quickly processing those rejected requests. As a result, the response time is minimized. In one embodiment where the application server is a web server, the rejection response may be an HTTP service unavailable message. The server may also redirect the client to a different server if available or ask the client to try again later.

Another advantage of the present invention is that it minimizes (1) the possibility of TCP timeouts and (2) the possibility of a request stored in the listen queue 42 from being dropped. This is due to the fact that the network interaction module 45 fetches all of the requests currently stored in the listen queue 42 into the server application system 44, regardless of the number of fetched requests actually processed by the application module 46. This in turn minimizes the possibility that requests may be dropped from the listen queue 42 (and thus causing TCP timeouts) when the listen queue 42 becomes full. A further advantage of the present invention is that it allows the server application system 44, rather than the system's TCP/IP stack in the kernel 41 of the data service system 40, to decide which, if any, of the external requests need to be denied service.

In summary, the key of the present invention is to avoid overflow in the listen queue 42 by bringing in requests into the server application system 44 and rejecting the overflow requests with notification to the requesters. This also allows the application system 44 to decide which of the fetched requests are not to be processed. For example, if the application system 44 can process ten requests per second and the rate of incoming requests at the listen queue 42 is twenty requests per second, then the application system 44 cannot process all of the incoming requests arrived at the listen queue and has to deny access to some of them. If the prior art sequential processing model is used, the application system does not have a choice because the requests are fetched from the listen queue 42 and processed on FIFO basis. Using the present invention, the application system 44 can decide which of the requests are not to be processed. The server application system 44 and its network interaction module 45 will be described in more detail below, also in conjunction with FIGS. 3–8.

Referring again to FIG. 3, the data service system 40 can be employed by an Internet Service Provider (ISP) to offer data services (e.g., web, news, advertisement, or e-mail) and other services (e.g., e-commerce) to users or subscribers connected to the data service system 40. Here, a customer means the entity contracting with the data service system 40 to have its content hosted in the data service system 40, or to have its services offered through the data service system 40. A user or subscriber means the entity accessing the data service system 40 through a remote user terminal via a communication network.

In general, the data service system 40 is implemented by or operates in a computer (or data processing) system with a network communication capability. For example, the data service system 40 can be implemented by or operates in a server computer system, a workstation computer system, a mainframe computer system.

As described above, the data service system 40 includes the server application system 44 and the kernel 41 which includes the operating system of the data service system 40. FIG. 3 only shows the kernel 41 and the server application system 44 for illustration purposes. In practice, the data service system 40 includes many other modules. Because description and illustration of these other modules do not aid in the description of the present invention, they are not shown in FIG. 3 and will not be described in more detail below.

As described above, the kernel 41 includes the TCP listen queue 42. In addition, the kernel 41 includes a TCP/IP stack (not shown) that handles known communication and protocol tasks so that TCP connection requests can be received into the kernel 41. The TCP/IP stack then stores the connection requests in the listen queue 42 before they are fetched into the server application system 44. The TCP/IP stack in the kernel 41 also maintains the listen queue 42.

The kernel 41 is basically the operating system of the data service system 40 (e.g., Windows NT, HP/Unix, Lunix, Solaris, etc.). The kernel 41 receives external TCP connection requests for the server application system 44 from an external network (not shown in FIG. 3). The kernel 41 can be implemented using any known means.

The length of the listen queue 42 is predetermined. This means that the listen queue 42 can store n connection requests before they are sent to the server application system 44, wherein n is a predetermined integer. The listen queue 42 can be implemented using any known technology. If the listen queue 42 is fill, newly arrived requests will be dropped off the queue, thus causing TCP timeouts at the user terminals. By using the network interaction module 45 in the server application system 44, the chances of TCP timeouts and request being dropped are minimized. This will be described in more detail below.

The server application system 44 that embodies one embodiment of the present invention is a TCP/IP-based server application system in the data service system 40. A TCP/IP-based server application system is a connection-based server system. An example of such a system is a web content server, an e-mail server, a news server, an e-commerce server, a proxy server, a domain name server, and a local service server. This means that the server application system 44 can be any one of the above-mentioned servers. Alternatively, the server application system 44 is applicable to any system in which connection-oriented communication is used for data exchange.

The network interaction module 45 of the server application system 44 is connected to the listen queue 42 and to the application module 46. The application module 46 performs the predetermined server function of the server application system 44. For example, if the server application system 44 is a web server, then the application module 46 performs the web server function which may include hosting web content and processing requests to retrieve their web pages. The application module 46 is implemented using any known technology. The structure of the application module 46 is also known and dependent on the type of server it implements. Thus, the structure of the application module 46 will also not to be described in more detail below.

The main functions of the network interaction module 45 are to periodically fetch the requests stored in the listen queue 42 into the server application system 44, and to determine which, if any, of the fetched requests are not to be processed by the application module 46 based on the processing capacity of the application module 46 and the rate of the incoming requests arriving at the listen queue 42. The network interaction module 45 also notifies the requesters of the rejected requests. For example, if the server application system 44 is a web server, then the network interaction module 45 can return a service unavailable response (in HTTP format) to the client, or redirect the client to a different server, or ask the client to try again later.

The periodical fetching function means the network interaction module 44 fetches all of the requests stored in the listen queue 42 in each cycle, no matter whether the application module 46 will actually process all of them or not. This prevents the listen queue 42 from becoming full and thus dropping requests off.

The determination function of the network interaction module 45 is done by first determining, after a fetch, if any new requests are arriving at the listen queue 42. If so, then the network interaction module 45 reduces the number of requests previously determined to be processed by the application module 46. In one embodiment, this reduction is by a factor of two. The reduced number cannot be less than one.

If there is no new request arriving at the listen queue 42, then the network interaction module 45 increases the predetermined number of requests to be processed by the application module 46. For example, the increase can be achieved by a factor of two (i.e., doubling). The number (or the doubled number) cannot exceed the length of the external listen queue 42. The network interaction module 44 allows the unprocessed requests, if any, to remain in its internal queue (i.e., the internal queue 62 of FIG. 4). Then the network interaction module 44 fetches all the new requests from the external listen queue 42 in the next cycle and causes all of the newly fetched requests that cannot be stored in the internal queue not to be processed (i.e., rejected).

The network interaction module 45 rejects those not-to-be-processed requests. This, however, prevents TCP timeouts from occurring because the rejected requests are rejected from within the server application system 44. The rejection is done by either closing the TCP connections of those rejected requests, or sending rejection responses with status information to the requesters. The structure of the network interaction module 45 is shown in FIG. 4, which will be described in more detail below.

Figure 4:
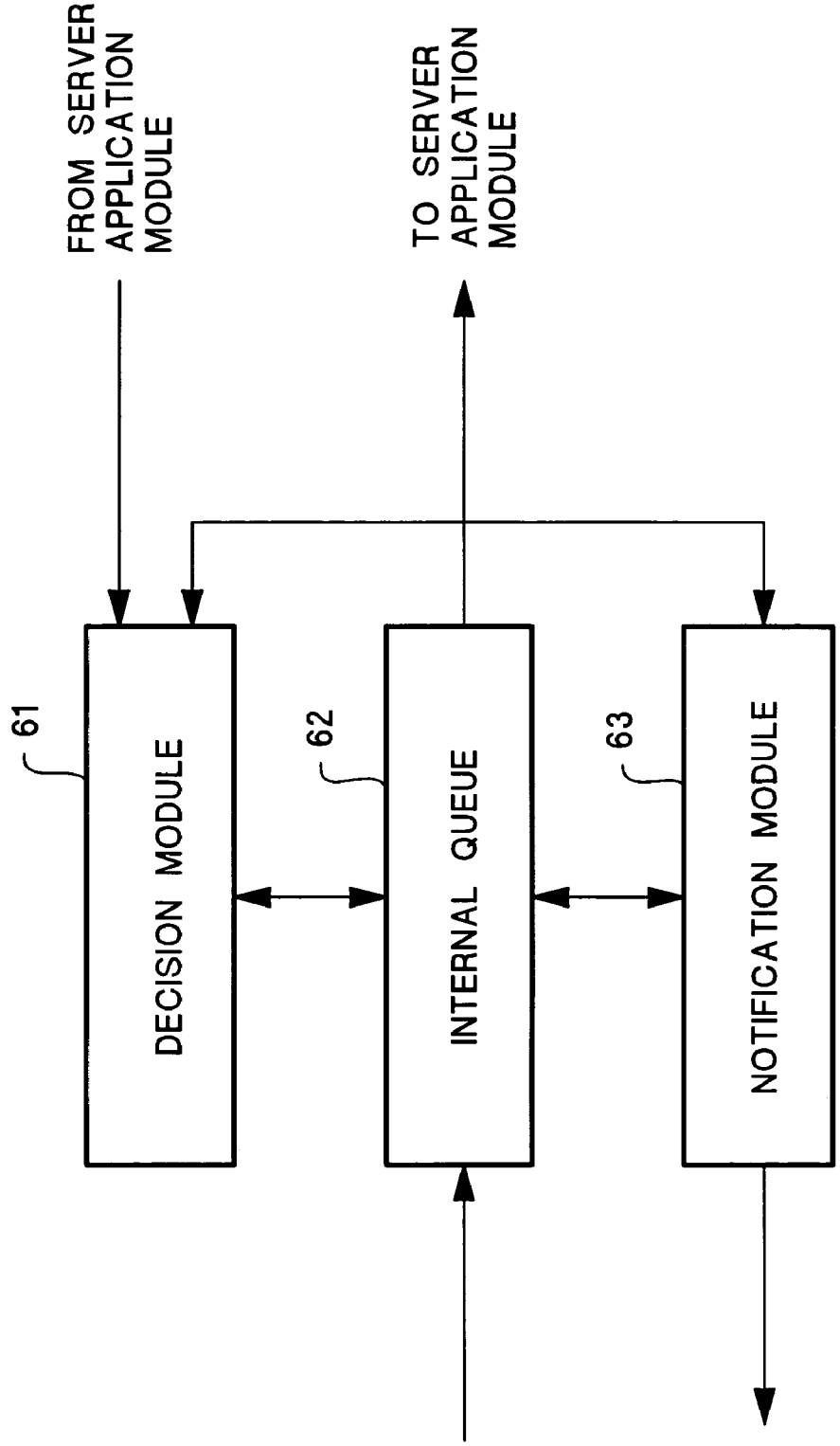
FIG. 4 shows the structure of the network interaction module of the server application system of FIG. 3.

As can be seen from FIG. 4, the network interaction module 45 includes a decision module 61, the internal queue 62, and a notification module 63. The decision queue 61 is the control module of the network interaction module 45 and performs the main functions of the network interaction module 45. The decision module 61 also controls the operation of the other two modules 62–63. The internal queue 62 is used to store the fetched requests from the listen queue 42 (FIG. 3). The notification module 63 is used to notify the requesters that their requests have been rejected and not processed. All of the modules 61–63 can be implemented using known technology.

The main purpose of the internal queue 62 is to allow the decision module 61 to fetch all of the requests currently stored in the listen queue 42 into the application system 44 in each operation cycle. In addition, the internal queue 62 allows the requests that the decision module 61 has accepted and not yet processed during the current operation cycle to remain in the server application system 44. With this, because the unprocessed requests are held in the internal queue 62, rather than the external listen queue 42 which is maintained by the TCP/IP stack in the kernel 41, the network interaction module 45 handles bursts of incoming requests effectively. The length of the internal queue 62 is also predetermined and should be at least as long as that of the listen queue 42. In one embodiment, the internal queue 62 has the same length (i.e., n) as the listen queue 42. In another embodiment, the length of the internal queue 62 is longer than the length of the listen queue 42.

When the number of pending connection requests exceeds the length of the internal queue 62, the network interaction module 45 explicitly denies service to subsequent incoming requests until it can make room in the internal queue 62. The operation of the modules 61–63 are described in more detail below. Since the operation of the network interaction module 44 is cycled, the description of the modules 61–63 will be with respect to two adjacent operation cycles.

Before a particular operation cycle starts, the decision module 61 knows the number of requests that the application module 46 will process. That number was determined by the decision module 61 during a previous operation cycle immediately before the particular operation cycle.

During that particular operation cycle, the decision module 61 first fetches all the requests currently accumulated in the listen queue 42. The fetched requests are stored in the internal queue 62. Then the decision module 61 determines the number of the fetched requests (i.e., m) to be processed by the application module 46 (FIG. 3) based on the processing capacity of the application module 46 and the rate of incoming requests received in the listen queue 42. The number m should be less than n (i.e., the length of the listen queue 42 and also the maximum number of requests that can be fetched from the listen queue 42 in one cycle). The decision module 61 determines the value of m. The process is as follows.

There are tradeoffs in selecting the value of m. The smaller the value of m relative to the value of n, the higher the chance that the decision module 61 is able to drain the listen queue 42 without entailing queue overflows. In this case, more requests will be queued in the internal queue 62. At the same time, however, the smaller the value of m, the larger the delay before a request is processed by the application module 46. Hence, while a smaller value of m is preferred when the application module 46 is overloaded, a larger value of m (e.g., approaching the value of n) is preferred when the application module 46 is lightly loaded. To achieve optimum performance, the decision module 61 dynamically adjusts the value of m based on the input load at the listen queue 42. This is done by first determining if new requests are received in the listen queue 42. If so, the decision module 61 reduces (e.g., by half) the value of m (i.e., the number of requests to be processed by the application module 46). Here, m is previously determined and cannot be less than one. If, however, the decision module 61 determines that no new requests are received in the external listen queue 62, then the value of m is increased (e.g., doubled). Here, the limit is that m cannot exceed the length of the listen queue 42. The unprocessed requests remain in the internal queue 62. In one embodiment, the value of m is either reduced by half or doubled (although other values are also possible).

Next, the decision module 61 accesses the external listen queue 42 to fetch all the new requests into the internal queue 62. If some or all of the newly fetched requests cannot be stored in the internal queue 62 because the queue is full, then these requests are regarded as not-to-be-processed requests and the network interaction module 45 will reject them. The rejection and notification is done by the notification module 63. The notification module 63 can either close the TCP connections of those requests or sending a rejection response with a status code to the requesters of those requests. For example, if the application server is a web server, the rejection response could be a "service unavailable" response. It could also a redirection message (directing the client to a different server) or ask the client to try it again later.

Figure 5:
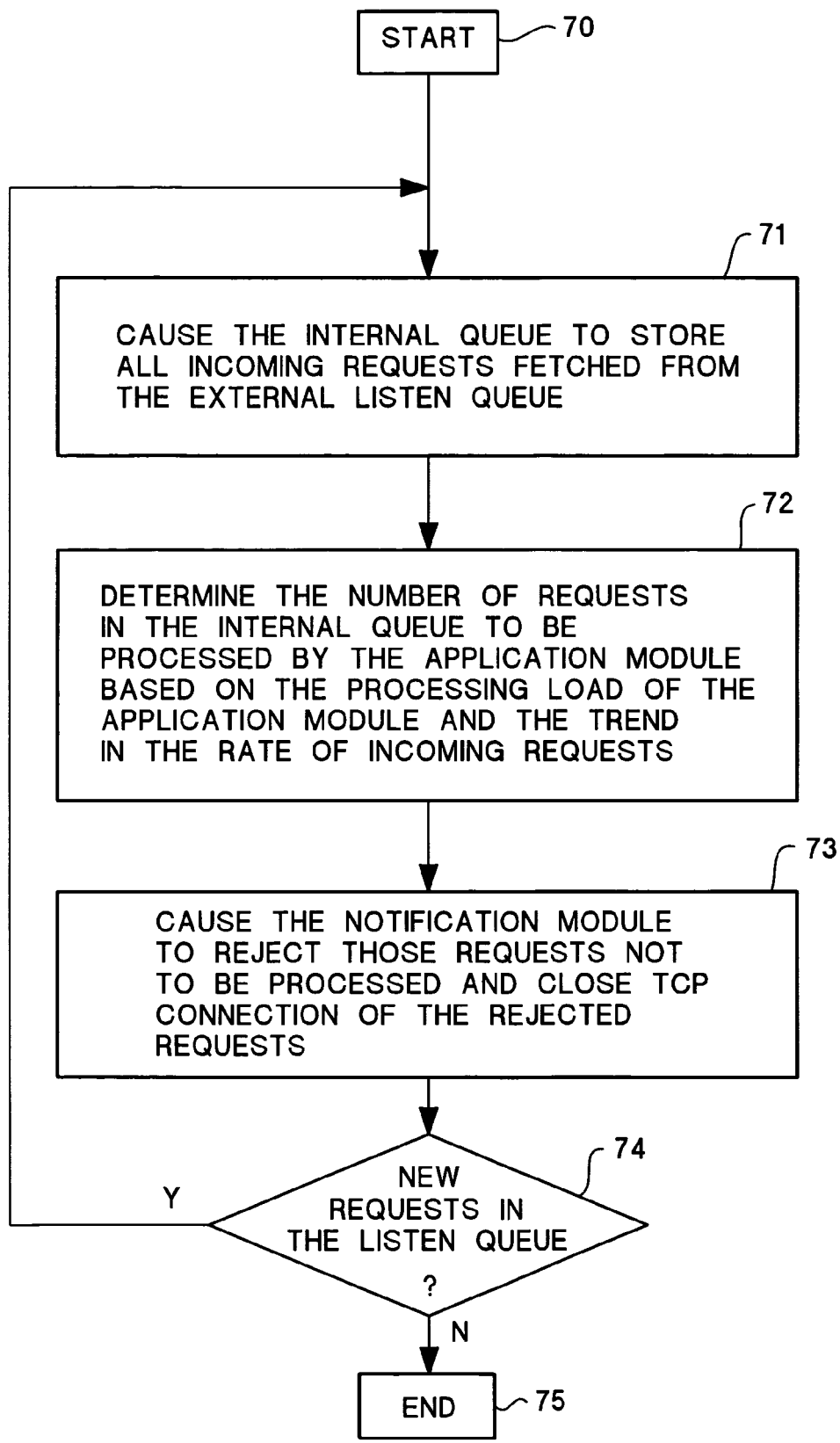
FIG. 5 is a flowchart diagram showing the process of the decision module of FIG. 4.

FIG. 5 shows the flowchart diagram of the control process of the decision module 61 of FIG. 4. As can be seen from FIG. 5, the process starts at the step 70. At the step 71, the decision module 61 fetches all the requests stored in the external listen queue 42 (FIG. 3) into the server application system 44 (FIG. 3). In addition, the decision module 61 causes the internal queue 62 to store the fetched requests. Then at the step 72, the decision module 61 determines the number of requests not to be processed by the application module 46 (FIG. 3) based on the processing capacity of the application module 46 at that time and the rate of the incoming requests arriving at the listen queue 42.

At the step 73, the decision module 61 causes the notification module 63 to reject the not-to-be-processed requests and to notify the requesters. As described above, there are a number of ways that the notification module 63 can notify the requesters. One method is to have the notification module 63 simply closes the TCP connections of the rejected requests. Another method is to have the notification module 63 send a rejection response with status information. Then the process moves to the step 74, at which it is determined whether new requests are accumulating in the listen queue 42. If so, the process returns to the step 71. Otherwise, the process ends at the step 75.

Figure 6:
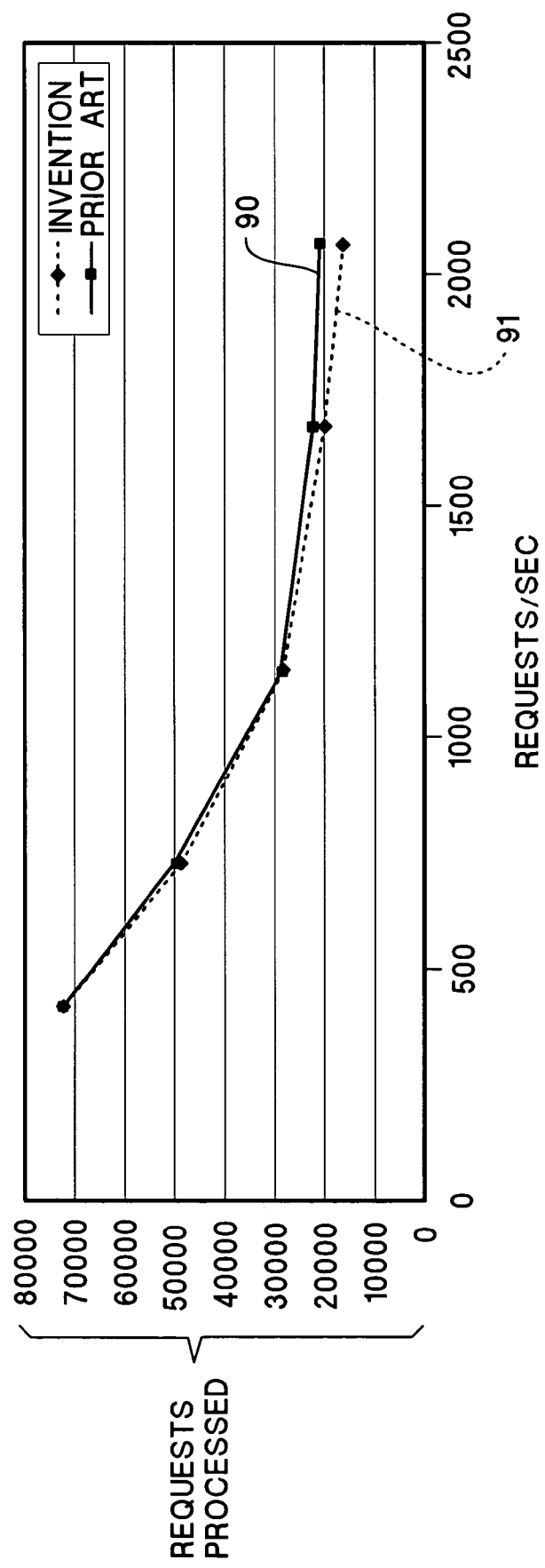
FIGS. 6–8 show various performance comparisons of the present invention model versus the prior art sequential arrangement.
Figure 7:
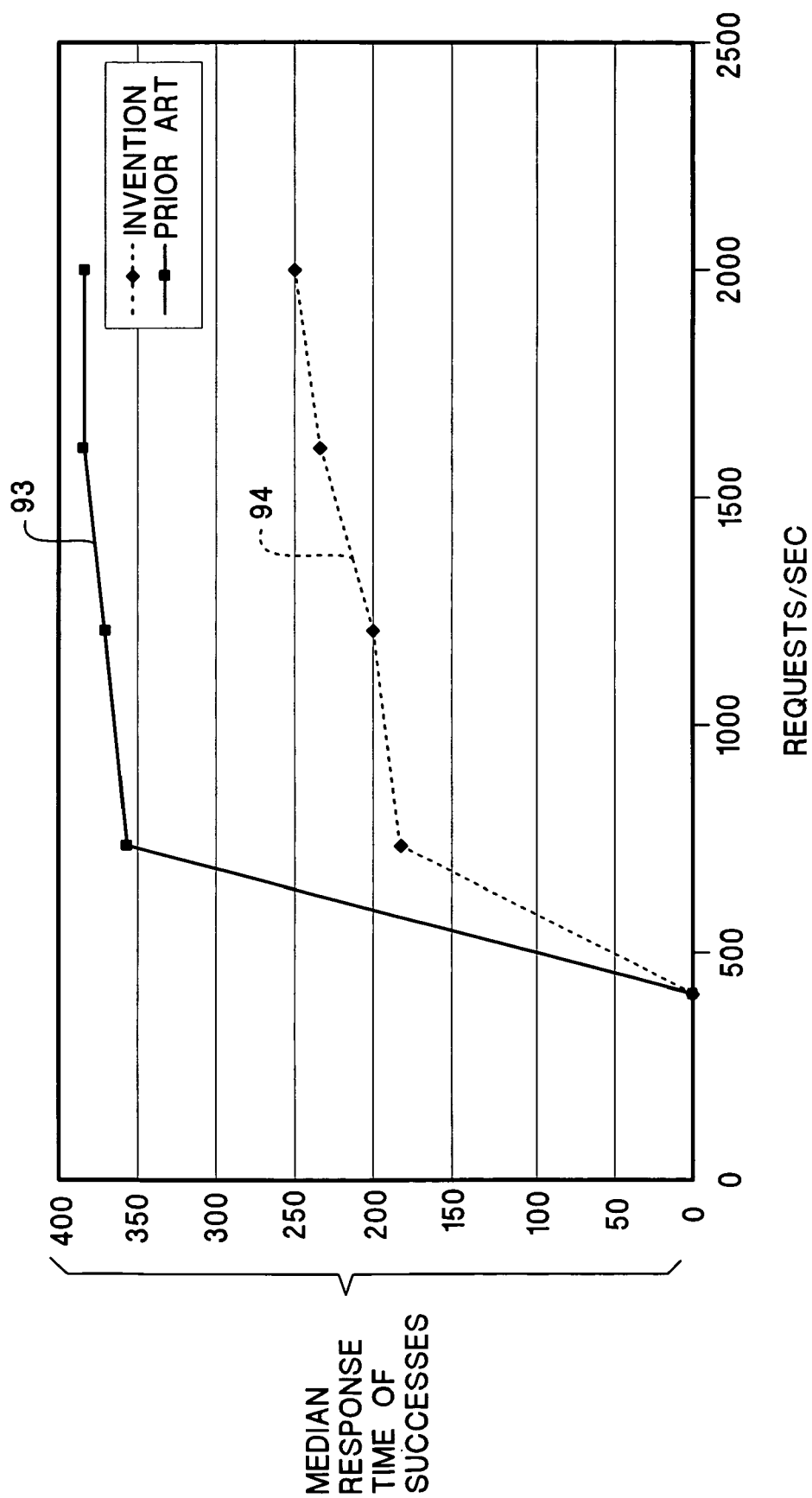
Figure 8:
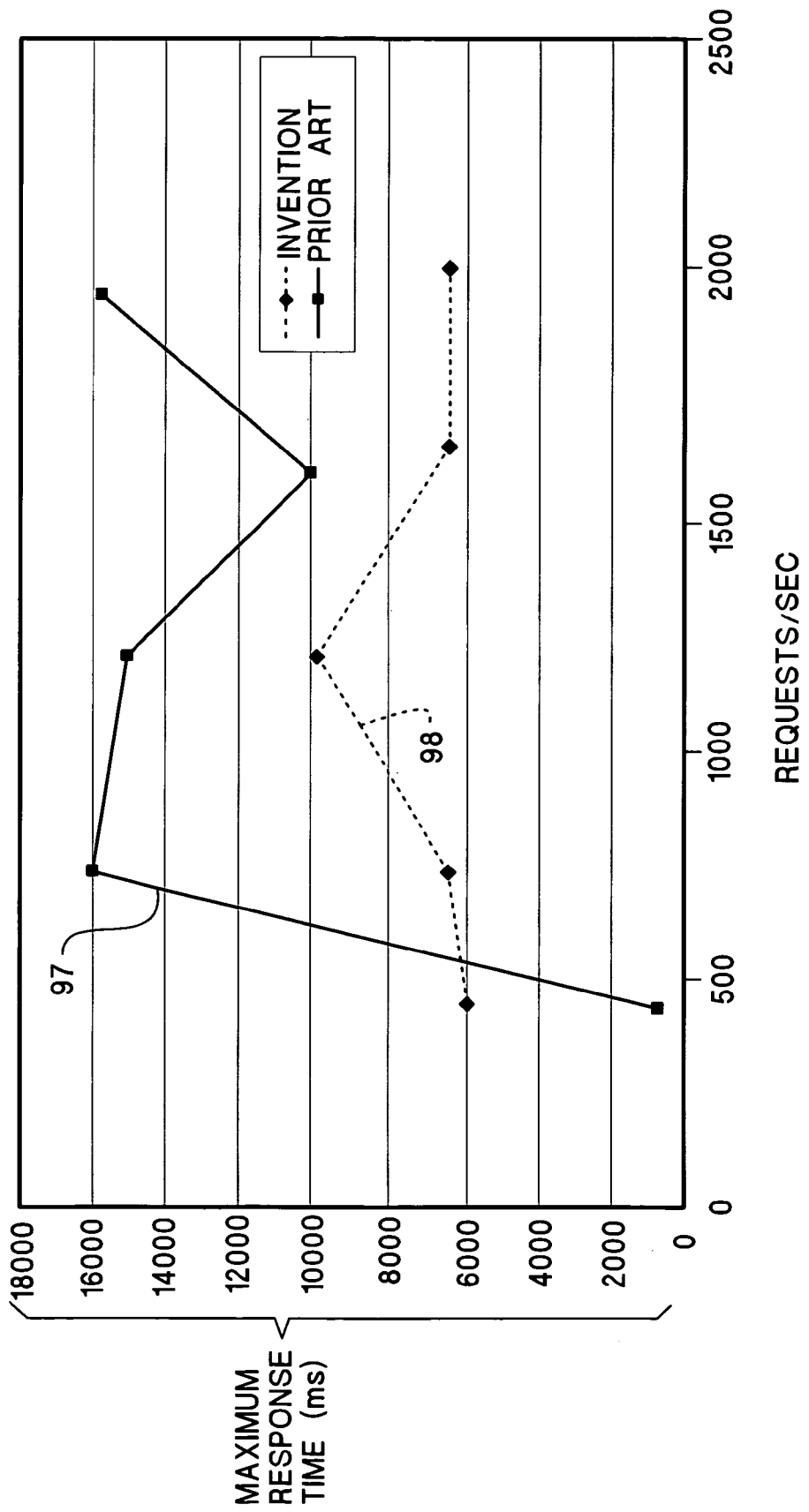

FIGS. 6–8 show the comparison of the present invention against the prior art sequential model under various performance metrics. FIG. 6 shows the comparison between the present invention and prior art for the requests processed. As can be seen from FIG. 6, the number of requests processed decline for both the present invention and prior art as the rate of requests received increases. However, the two curves (i.e., curves 90–91) show that there is not much difference between the present invention and prior art for the number of requests processed.

FIG. 7 shows the comparison of the present invention with and prior art for median response time of successes. As can be seen from FIG. 7, the median response time of successes is significantly lower under the present invention arrangement than under the prior art sequential model. FIG. 8 shows the comparison under the maximum response time. As can be seen from FIG. 8, the maximum response time is also significantly lower under the present invention arrangement than under the prior art sequential model (after the request rate moves beyond the 500 per second mark).

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A TCP/IP-based application system, comprising:
   an application module that performs predetermined functions based on external requests from an external queue, the external queue being external to the application system and storing the external requests before the requests are fetched into the application system;
   a network interaction module coupled to the application module and the external queue (1) to fetch the external requests from the external queue into the application system and (2) to determine which, if any, of the fetched requests will not be processed by the application module based on the processing capacity of the application module and the rate of the external requests arriving at the external queue.

2. The TCP/IP-based application system of claim 1, wherein the network interaction module rejects those requests determined not to be processed by the application module.

3. The TCP/IP-based application system of claim 2, wherein the network interaction module rejects the requests not to be processed by closing their connections.

4. The TCP/IP-based application system of claim 2, wherein the network interaction module rejects the requests not to be processed by returning a rejection response with a status code.

5. The TCP/IP-based application system of claim 4, wherein the rejection response returned by the network interaction module is a HTTP response.

6. The TCP/IP-based application system of claim 1, wherein the network interaction module also determines which of the fetched requests will be processed first by the application mode.

7. The TCP/IP-based application system of claim 1, wherein the network interaction module further comprises:
   an internal queue of a predetermined length that receives and stores the external requests fetched from the external queue;
   a decision module that (1) causes the external requests to be fetched into the internal queue and (2) determines which of the fetched requests will be processed by the application module and which of the fetched requests will not be processed by the application module based on the processing capacity of the application module and the rate of the external requests arriving at the external queue;
   a notification module that requests the requests that are determined not to be processed.

8. The TCP/IP-based application system of claim 7, wherein the length of the internal queue is at least equal to that of the external queue.

9. The TCP/IP-based application system of claim 1, wherein the notification module rejects the requests that are determined not to be processed by either closing their connections or sending a rejection response with status code.

10. The TCP/IP-based application system of claim 7, wherein the decision module determines which of the fetched requests will not be processed by the application module by:
    reducing the number of requests to be processed by the application module if new requests are received in the external queue, wherein the number is previously determined and cannot be less than one;
    increasing the number of requests to be processed by the application module if no new requests are received in the external queue, wherein the number cannot exceed the length of the external queue;
    storing remaining unprocessed requests in the internal queue;
    fetching all new request from the external queue into the internal queue and causing all of the newly fetched request that cannot be stored in the internal queue not to be processed.

11. The TCP/IP-based application system of claim 10, wherein the number of requests to be processed is either increased or reduced by a factor of two.

12. The TCP/IP-based application system of claim 1, wherein the network interaction module determines which of the fetched requests will not be processed by the application module by:
    reducing the number of requests to be processed by the application module if new requests are received in the external queue, wherein the number is previously determined and cannot be less than one;
    increasing the number of requests to be processed by the application module if no new requests are received in the external queue, wherein the number cannot exceed the length of the external queue;
    storing remaining requests in an internal queue;
    fetching all new requests from the external queue into the internal queue and causing all of the newly fetched requests that cannot be stored in the internal queue not to be processed.

13. The TCP/IP-based application system of claim 1, wherein the number of requests to be processed is either increased or reduced by a factor of two.

14. In a TCP/IP-based application system, a method of minimizing response time of the application system to external requests, comprising the steps of:
    periodically fetching all of external requests stored in an external queue external to the application system into an internal queue of the application system;
    determining which, if any, of the fetched requests not to be processed by the application system based on the processing capacity of the application module and the rate of the external requests arriving at the external queue;
    rejecting the requests not to be processed such that the possibility of dropping a request from the external queue is minimized and the response time of the application system to the requests is minimized.

15. The method of claim 14, wherein the step of rejecting the requests not to be processed is performed by closing their connections.

16. The method of claim 14, wherein the step of rejecting the requests not to be processed is performed by returning a rejection response with a status code.

17. The method of claim 16, wherein the rejection response is a HTTP response.

18. The method of claim 14, further comprising: the step of determining which of the fetched requests will be processed first.

19. The method of claim 14, wherein the step of determining which of the fetched requests are not to be processed further comprises the steps of:
   reducing the number of requests to be processed if new requests are received in the external queue, wherein the number is previously determined;
   increasing the number of requests to be processed if no new requests are received in the external queue;
   storing remaining requests in an internal queue of the application system;
   fetching all new requests from the external queue into the internal queue and causing all of the newly fetched requests than cannot be stored in the internal queue not to be processed.

20. The method of claim 19, wherein the number of requests to be processed is either increased or reduced by a factor of two.

* * * * *

UNITED STATES PATENT AND TRADEMARK OFFICE
CERTIFICATE OF CORRECTION

| | | |
|---|---|---|
| PATENT NO. | : 7,117,263 B1 | Page 1 of 1 |
| APPLICATION NO. | : 09/495818 | |
| DATED | : October 3, 2006 | |
| INVENTOR(S) | : Preeti N. Bhoj et al. | |

It is certified that error appears in the above-identified patent and that said Letters Patent is hereby corrected as shown below:

On the title page, in item (75), in "Inventors", in column 1, line 1, delete "Bhoi" and insert -- Bhoj --, therefor.

In column 2, line 1, after "from" insert -- the --.

In column 5, line 55, delete "fill" and insert -- full --, therefor.

In column 10, line 1, in Claim 9, delete "claim 1," and insert -- claim 7, --, therefor.

In column 10, line 44, in Claim 13, delete "claim 1," and insert -- claim 12, --, therefor.

Signed and Sealed this
Twenty-seventh Day of September, 2011

David J. Kappos
*Director of the United States Patent and Trademark Office*